United States Patent
Thompson et al.

(10) Patent No.: US 11,569,656 B2
(45) Date of Patent: Jan. 31, 2023

(54) SURGE PROTECTION DEVICES WITH SURGE LEVEL DISCRIMINATION AND METHODS OF OPERATING THE SAME

(71) Applicant: Eaton Intelligent Power Limited, Dublin (IE)

(72) Inventors: James William Thompson, Aliquippa, PA (US); James Nicholas Skoczlas, Bridgeville, PA (US)

(73) Assignee: Eaton Intelligent Power Limited, Dublin (IE)

( * ) Notice: Subject to any disclaimer, the term of this patent is extended or adjusted under 35 U.S.C. 154(b) by 41 days.

(21) Appl. No.: 17/076,116

(22) Filed: Oct. 21, 2020

(65) Prior Publication Data
US 2022/0123548 A1    Apr. 21, 2022

(51) Int. Cl.
| | |
|---|---|
| *H02H 9/02* | (2006.01) |
| *H02H 9/00* | (2006.01) |
| *H02H 3/08* | (2006.01) |
| *H02H 9/04* | (2006.01) |
| *H02H 9/06* | (2006.01) |

(52) U.S. Cl.
CPC ............ *H02H 9/005* (2013.01); *H02H 3/08* (2013.01); *H02H 9/02* (2013.01); *H02H 9/04* (2013.01); *H02H 9/044* (2013.01); *H02H 9/06* (2013.01)

(58) Field of Classification Search
CPC .. H02H 3/08; H02H 3/00; H02H 9/04; H02H 9/044; H02H 9/005; H02H 9/06; H02H 3/22; H02H 9/02; G01R 31/08; G01R 31/28; G01R 31/2827; G01R 31/1236; G01K 13/00; H02J 13/00026

USPC .................................................. 361/117–120
See application file for complete search history.

(56) References Cited

U.S. PATENT DOCUMENTS

| | | | |
|---|---|---|---|
| 4,594,051 A | 6/1986 | Gaston | |
| 8,179,653 B2 | 5/2012 | Gerlach | |
| 9,401,594 B2 | 7/2016 | Zhu et al. | |
| 10,110,216 B1 | 10/2018 | Knoedgen et al. | |
| 2004/0085696 A1* | 5/2004 | Mendoza | H02H 3/048 361/93.1 |
| 2006/0232906 A1* | 10/2006 | Sueoka | H02H 3/048 361/118 |
| 2007/0097584 A1* | 5/2007 | Ducharme | H02H 9/044 361/118 |

(Continued)

OTHER PUBLICATIONS

Submittal Specification Sheet, Eaton Innovative Technology, Model PTX160 Surge Protective Device, UL 1449 3$^{rd}$ Edition; Aug. 2011; 2 pages.

(Continued)

*Primary Examiner* — Danny Nguyen
(74) *Attorney, Agent, or Firm* — Stanek Lemon Crouse & Meeks, P.A.

(57) ABSTRACT

An apparatus includes a surge protection device, a current sensor configured to sense a current through the surge protection device, and a surge discriminator circuit coupled to the current sensor and configured to discriminate among a plurality of surge levels for the surge protective device responsive to the sensed current. The current sensor may include a current transformer configured to generate a secondary current responsive to the sensed current and the surge discriminator circuit may be configured to discriminate among a plurality of surge levels responsive to the generated secondary current.

10 Claims, 6 Drawing Sheets

(56) References Cited

U.S. PATENT DOCUMENTS

| | | |
|---|---|---|
| 2009/0323242 A1* | 12/2009 | Shibayama ............ H02H 3/093 |
| | | 361/93.6 |
| 2010/0014205 A1 | 1/2010 | Gerlach |
| 2015/0364916 A1* | 12/2015 | Chung .................... H04L 25/00 |
| | | 361/91.2 |
| 2016/0126728 A1* | 5/2016 | Kawabata ................ H01C 7/12 |
| | | 361/56 |
| 2016/0212265 A1 | 7/2016 | Philonenko et al. |
| 2017/0287664 A1 | 10/2017 | Elsherbini et al. |
| 2018/0224873 A1 | 8/2018 | Motz et al. |
| 2018/0331093 A1 | 11/2018 | Takahashi et al. |
| 2019/0044322 A1 | 2/2019 | Hijazi et al. |
| 2019/0393698 A1 | 12/2019 | Joo et al. |

OTHER PUBLICATIONS

*Eaton Innovative Technology Protector*, Technical Data TD01006002E; Jan. 2019; pp. 1-8.
*Eaton Innovative Technology XT Surge Protective Device*; Technical Data TD01006006E; Nov. 2018; pp. 1-4.
*Innovative Technology Surge Protection Solutions*; Eaton Innovative Technology; (2016) pp. 1-8.

\* cited by examiner

SURGE PROTECTION DEVICES WITH SURGE LEVEL DISCRIMINATION AND METHODS OF OPERATING THE SAME

BACKGROUND

Surge protection devices (SPDs) are commonly used to protect electrical and electronic equipment from damage caused by high energy lightning surges and other transient disturbances. These devices typically operate by shunting surge currents away from the protected component using devices such as a metal oxide varistor (MOVs), which can provide a low-impedance shunt path for the surge current. A typical application for an SPD is shown in FIG. 1, where an SPD 20 is coupled to a distribution panel 10 that distributes power from a feeder circuit 12 to multiple branch circuits 14. The SPD 20 may, for example, be coupled to bus bars within the panel 10 and may be located external to the panel 10 or integrated therein. SPDs may be similarly used in switchgear, switchboards, busways, motor control centers (MCCs), and the like.

A conventional SPD may have the capability of detecting and recording a number of surges that are experienced by the SPD. This information may, for example, enable maintenance personnel to determine whether the protected system requires additional protection. A conventional SPD may have current transformers or other current sensors that are used to sense currents passing through the MOVs of the SPD and circuitry for determining, for example, when the sensed current reaches a threshold that indicates a surge.

SUMMARY

Some embodiments of the inventive subject matter provide an apparatus including a surge protection device, a current sensor configured to sense a current through the surge protection device, and a surge discriminator circuit coupled to the current sensor and configured to discriminate among a plurality of surge levels for the surge protective device responsive to the sensed current. The current sensor may include a current transformer configured to generate a secondary current responsive to the sensed current and the surge discriminator circuit may be configured to discriminate among a plurality of surge levels responsive to the generated secondary current.

In some embodiments, the surge discriminator circuit may include a current to voltage (I/V) converter circuit having an input coupled to the current transformer and a plurality of detector circuits coupled to an output of the I/V converter circuit. The surge discriminator circuit may further include a processor circuit coupled to the detector circuits and configured to discriminate surge levels responsive to outputs of the detector circuits.

In some embodiments, the I/V converter circuit may include a rectifier circuit, a capacitor coupled across an output of the rectifier circuit, and a zener diode coupled in parallel with the capacitor. The I/V converter circuit may further include a voltage divider circuit coupled to the output of the rectifier circuit. The plurality of detector circuits may include a plurality of comparator circuits coupled to the I/V converter circuit and configured to compare a voltage produced by the I/V converter circuit to respective different reference voltages. The surge discriminator circuit may further include a processor circuit coupled to the comparator circuits and configured to discriminate a level of a surge responsive to outputs of the comparator circuits.

Additional embodiments provide an apparatus including a plurality of surge protection devices coupled to respective phases of a power system, a plurality of currents sensors configured to sense currents through respective ones of the surge protection devices, and a surge discriminator circuit coupled to the plurality of current sensors and configured to discriminate among a plurality of surge levels for the surge protective devices responsive to the sensed currents. The surge discriminator circuit may include a plurality of current to voltage (I/V) converter circuits, respective ones of which have inputs coupled to respective ones of the plurality of current transformers and a plurality of groups of detector circuits, respective one of the groups of detector circuits coupled to outputs of respective ones of the I/V converter circuits. The surge discriminator circuit may further include a processor circuit coupled to the groups of detector circuits and configured to discriminate surge levels responsive to outputs of the detector circuits.

In some embodiments, each of the I/V converter circuits may include a rectifier circuit, a capacitor coupled across an output of the rectifier circuit, and a zener diode coupled in parallel with the capacitor. Each of the I/V converter circuits may further include a voltage divider circuit coupled to the output of the rectifier circuit. The plurality of groups of detector circuits may include a plurality of groups of comparator circuits, respective ones of the groups coupled to respective ones of the I/V converter circuits. The surge discriminator circuit may further include a processor circuit coupled to the comparator circuits and configured to discriminate a level of a surge responsive to outputs of the comparator circuits.

In still further embodiments, methods include coupling a surge protection device to a phase of a power system, sensing a current through the surge protection device and discriminating among a plurality of surge levels for the surge protective device responsive to the sensed current. Sensing the current may include generating a secondary current in a current transformer responsive to the sensed current, and discriminating among a plurality of surge levels for the surge protective device responsive to the sensed current may include discriminating among a plurality of surge levels responsive to the secondary current. Discriminating among a plurality of surge levels responsive to the secondary current may include generating a voltage responsive to the secondary current and applying the voltage to a plurality of detector circuits. Discriminating among a plurality of surge levels responsive to the secondary current may further comprise applying outputs of the detector circuits to a processor circuit and operating the processor circuit to discriminate surge levels responsive to the outputs of the detector circuits. The detector circuits may include respective comparator circuits.

DETAILED DESCRIPTION

Figure 1:
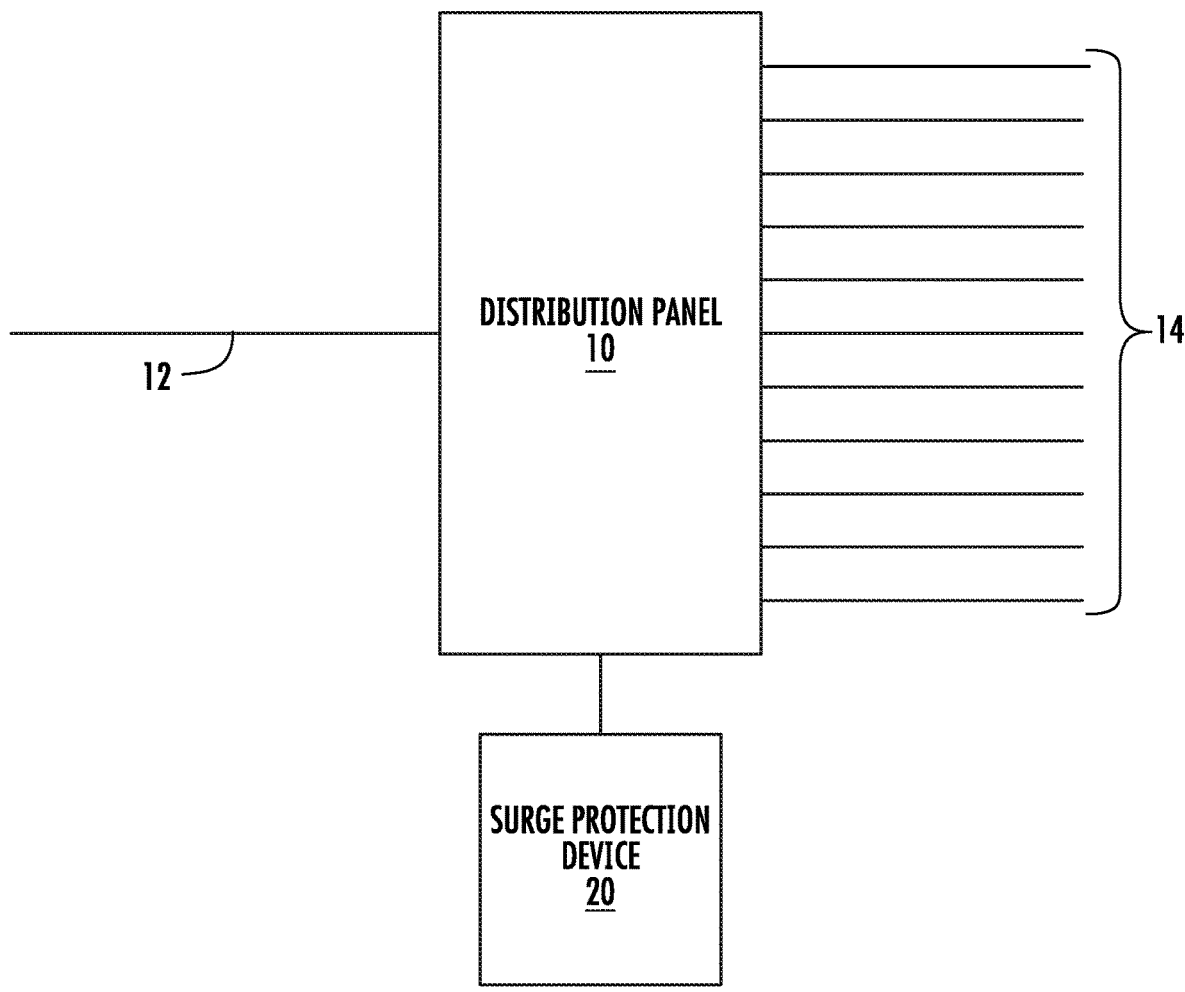
FIG. 1 is a schematic diagram illustrating a conventional application of an SPD.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
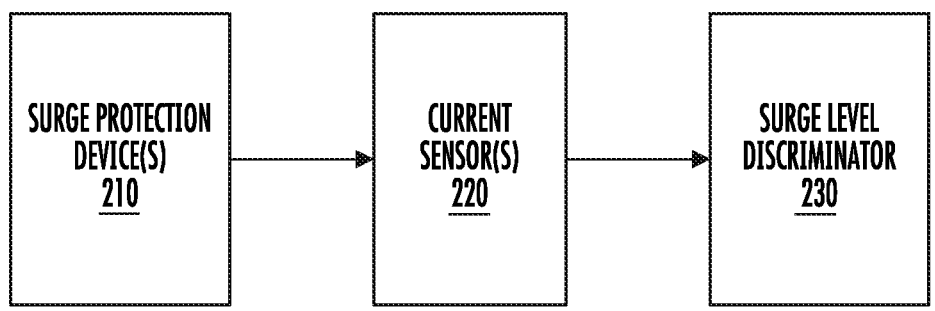
FIG. 2 is a schematic diagram illustrating an SPD according to some embodiments of the inventive subject matter.

FIG. 2 illustrates components of a surge protection apparatus according to some embodiments. The apparatus includes at least one surge protection device 210. The at least one surge protection device 210 may include, for example, one or more MOVs, transient voltage suppression (TVS) diodes, gas discharge tubes (GDTs), crowbar circuits, or a combination thereof. One or more current sensors 220 are configured to sense current passing through the one or more surge protection devices 210. A surge level discriminator circuit 230 discriminates among current surges of a plurality of different surge levels responsive to the sensed currents. For example, in embodiments described below the surge level discriminator circuit 230 may be configured to discriminate among current surges having predetermined low, medium and high levels. As further described below, information regarding the discriminated surges, such a relative numbers of surges for the various levels, may be communicated to a user using, for example, a local display included in the apparatus and/or via a web page.

Figure 3:
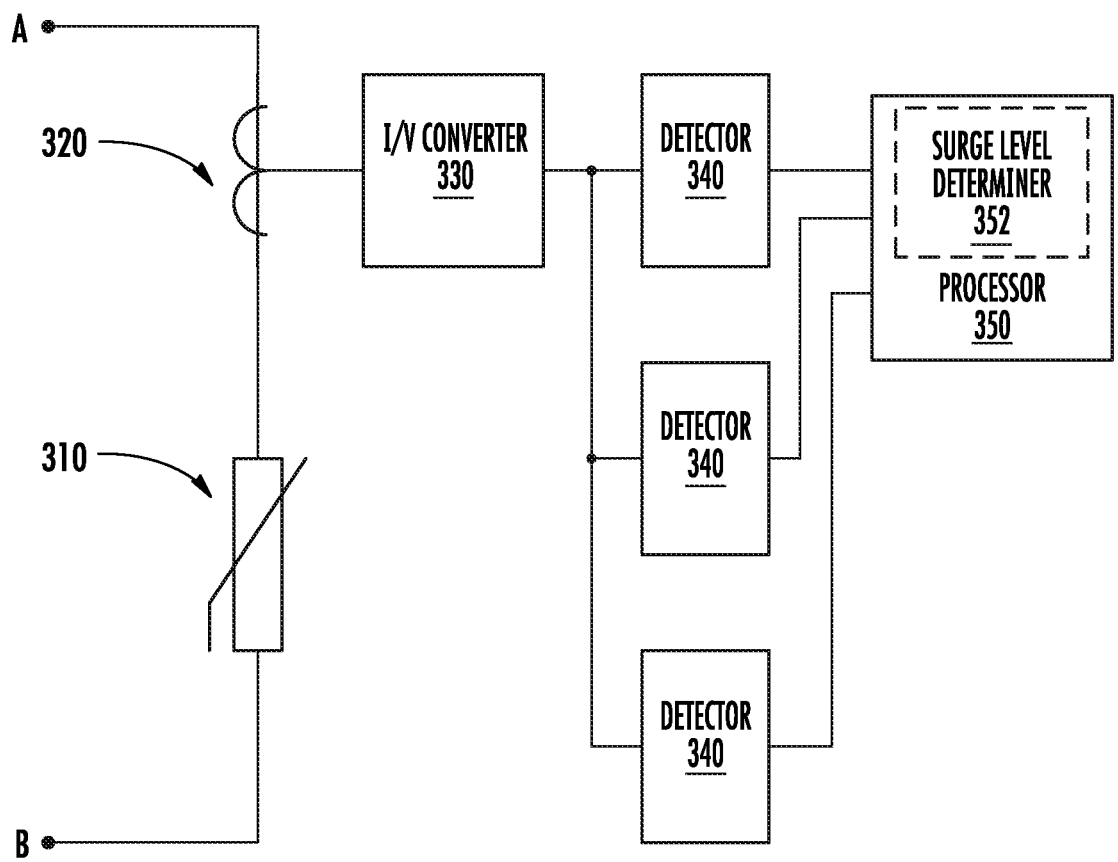
FIG. 3 is a schematic diagram illustrating surge discrimination circuitry for an SPD according to some embodiments.

FIG. 3 is a schematic diagram illustrating an example implementation of a surge protection apparatus according to further embodiments. The apparatus includes a surge protection device, here shown as a MOV 310, which is configured to shunt current between terminals A, B in responsive to a voltage imposed across the terminals A, B (e.g., from a lightning strike, power surge, or the like). A current transformer 320 is configured to sense current passing through the MOV 310. A current to voltage (I/V) converter circuit 330 has an input connected to the current transformer 320. When a surge current pulse passes through the MOV 310, the current transformer 320 develops a corresponding current pulse on its secondary that is converted into a proportional voltage level by the I/V converter circuit 330. This voltage is applied to a plurality of detector circuits 340 that are configured to detect whether the applied voltage has a level meeting respective level criteria.

For example, the detector circuits 340 may compare the voltage produced by the I/V converter circuit 330 to respective reference voltage levels and produce Boolean or other outputs indicative of whether the applied voltage exceeds the given reference voltage. The outputs of the detector circuits 340 may be applied to a processor 350 (e.g., a microcontroller or similar circuitry), which may have a surge level determiner application 352 executing thereon that is configured to determine the level of the surge through the MOV 310 based signals received from the detector circuits 340. The surge level determiner application 352 may be configured to record detective surges and their levels and may, for example, generate cumulative counts of how many surges of each level have occurred through the MOV 310.

Figure 4:
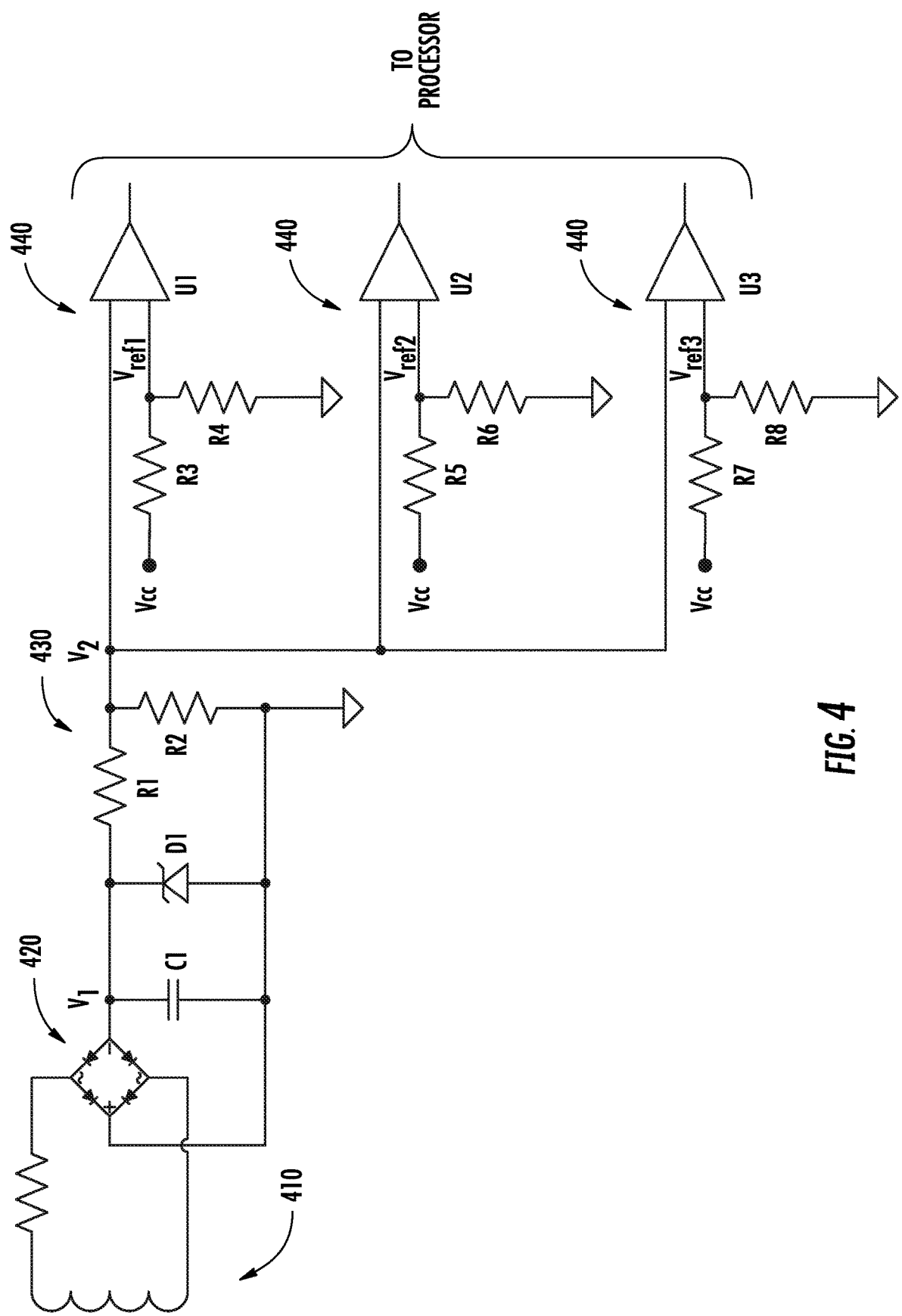
FIG. 4 a schematic diagram illustrating surge discrimination circuitry for an SPD according to further embodiments.

FIG. 4 illustrates an example implementation of the apparatus of FIG. 3. A diode bridge rectifier circuit 420 is connected to a secondary winding 410 of a current transformer. A current pulse developed in the current transformer secondary winding 410 is converted to a voltage $V_1$ by the rectifier circuit 420, a capacitor C1 and a zener diode D1. The voltage is divided down to a voltage $V_2$ by a voltage divider circuit 430 including resistors R1, R2. The voltage output $V_2$ of the voltage divider circuit 430 is applied to detector circuits 440, each of which includes a comparator U1, U2, U3. Different first, second and third reference voltages $V_{ref1}$, $V_{ref2}$, $V_{ref3}$ are provided to the respective comparators U1, U2, U3 using respective voltage divider circuits with respective resistor pairs R3/R4, R5/R6, R7/R8 that are coupled to a common power supply node $V_{CC}$. The comparators U1, U2, U3 provide respective digital outputs (e.g., "1" or "0") based on the relationship of the voltage $V_2$ to the first, second and third reference voltages $V_{ref1}$, $V_{ref2}$, $V_{ref3}$.

These digital outputs may be provided to a processor, which may determine a level of the surge pulse based on the digital outputs of the comparators U1, U2, U3. For example, if the first, second and third reference voltages $V_{ref1}$, $V_{ref2}$, $V_{ref3}$ correspond to low, medium and high thresholds, a pulse producing a level in the voltage $V_2$ that is greater than the first reference voltage $V_{ref1}$ but less than the second and third reference voltages $V_{ref2}$, $V_{ref3}$ will cause the first comparator U1 to produce a logic "1" output while the second and third comparators U2, U3 produce logic "0" outputs. The processor may identify this as a "low" level surge. A pulse producing a level in the voltage $V_2$ that is greater than the first and second reference voltages $V_{ref1}$, $V_{ref2}$ but less than the third reference voltage $V_{ref3}$ will cause the first and second comparators U1, U2 to produce logic "1" outputs and the third comparator U3 to produce a logic "0" output. This output may be identified as a "medium" level pulse. Similarly, a pulse producing a level in the voltage $V_2$ that is greater than the first, second and third reference voltages $V_{ref1}$, $V_{ref2}$, $V_{ref3}$ will cause the first, second and third comparators U1, U2, U3 to produce logic "1" outputs, which may be identified as a "high" level pulse.

Figure 5:
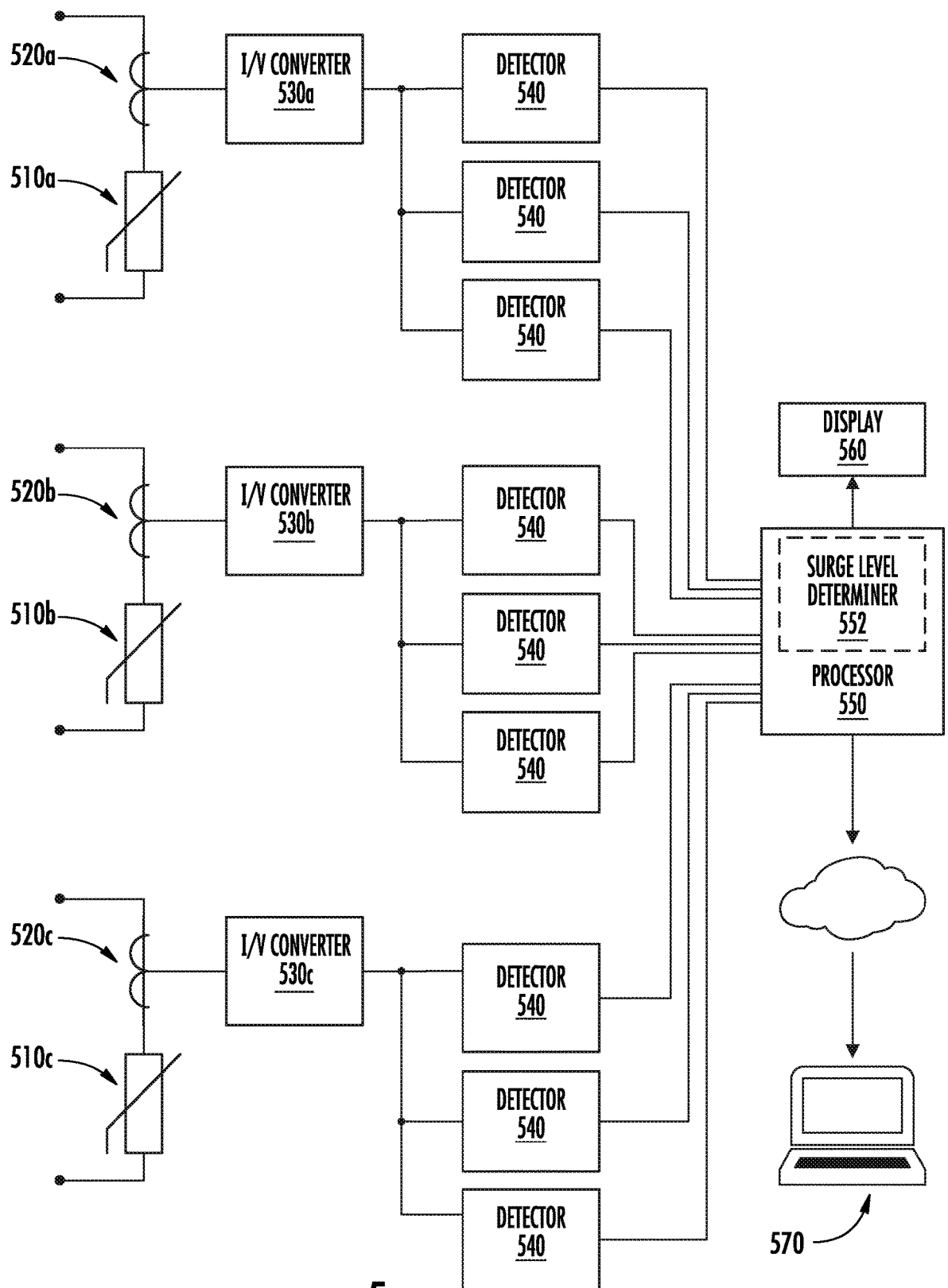
FIG. 5 a schematic diagram illustrating surge discrimination circuitry with per phase discrimination according to some embodiments.
Figure 6:
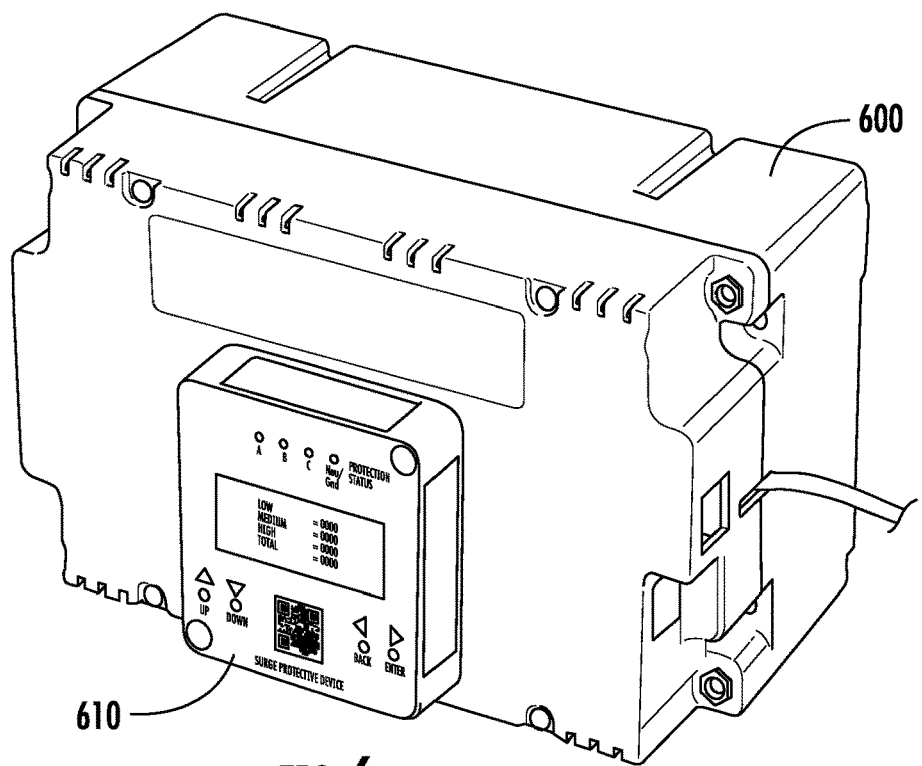
FIG. 6 illustrates an SPD with multi-level surge discrimination capability according to some embodiments.

According to further embodiments, surge discrimination circuitry along the lines above can be provided for individual phases of a multi-phase power system. Referring to FIG. 5, a surge protection apparatus includes first, second and third MOVs 510a, 510b, 510c, which are configured to protect respective first, second and third phases. Respective current transformers 520a, 520b, 520c are configured to sense currents through the respective MOVs 510a, 510b, 510c. Respective I/V converters 530a, 530b, 530c are coupled to the current transformers 520a, 520b, 520c, and produce respective voltages that are provided to respective groups of detector circuits 540 that discriminate among surge levels along the lines discussed above with reference to FIG. 3. The outputs of the detector circuits 540 are provided to a processor 550, which hosts a surge level determiner application 552 that identifies and records surges and their corresponding levels. This information may be provided to a display 560 and/or to a webpage that may be accessed by a remote user 570 via a network.

Figure 7:
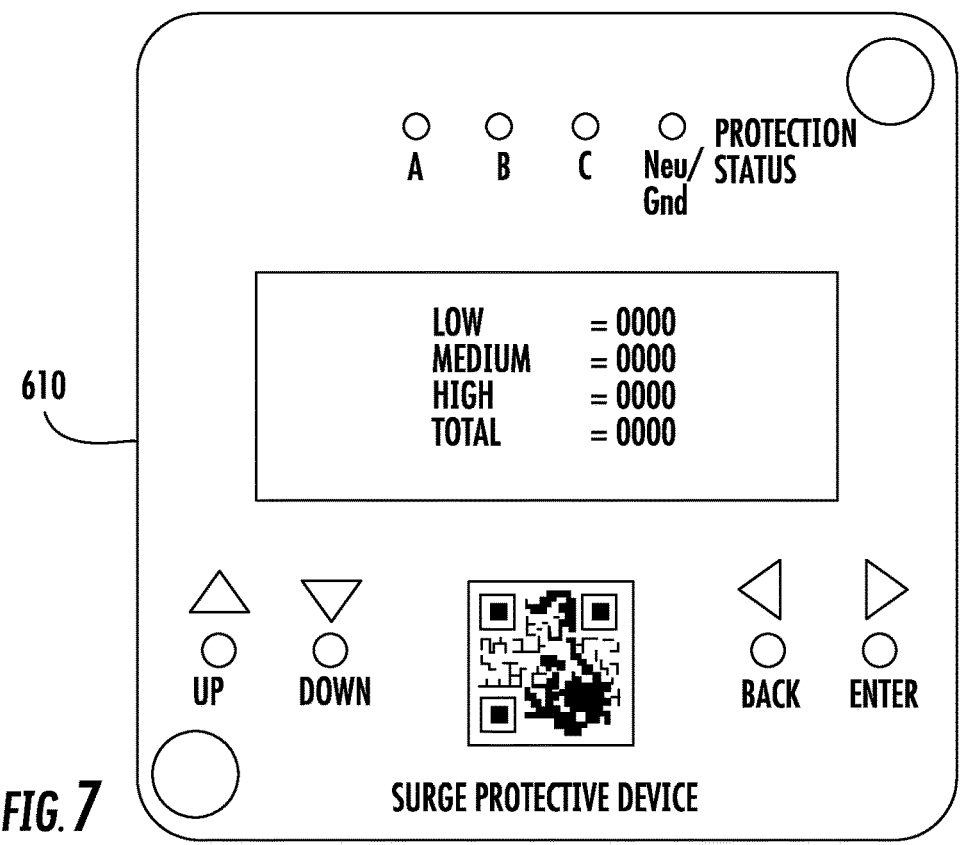
FIG. 7 illustrates a display of the SPD of FIG. 6.
Figure 8:
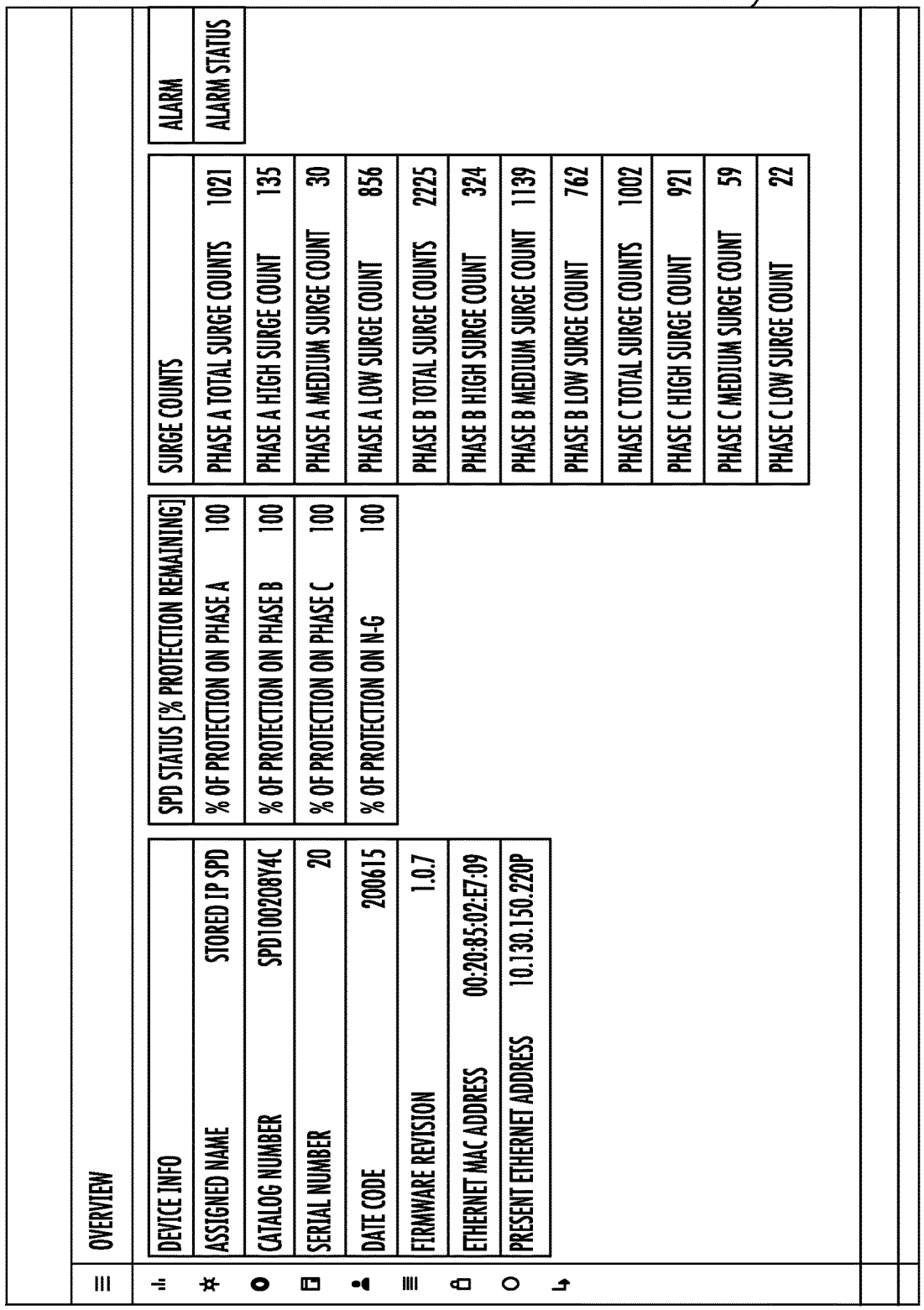
FIG. 8 illustrates a web page generated by the SPD of FIG. 6.

FIGS. 7 and 8 illustrates an example of an SPD 600 that may incorporate surge level discrimination circuitry along the lines discussed above. The SPD 600 may include a display 610 that is configured to display counts of surges of various level, specifically surges corresponding to "high," "medium" and "low" levels. Referring to FIG. 8, the SPD 600 may also include a network interface and may be configured to host a web page 800 that includes, among other information, counts of "high," "medium" and "low" surges experienced by surge protection devices (e.g., MOVs) of the SPD 600 that protect respective phases of a power system connected to the SPD 600.

It will be appreciated that further embodiments may vary from the exemplary embodiments described above. For example, an SPD according to some embodiments may be configured to discriminate for 2 levels or more than 3 levels. Different circuitry, such as circuitry that uses other types of current sensors (e.g., Hall effect sensors) and signal processing circuitry other than that shown in FIGS. 3-5 that is suitable for use with such alternative sensors. Embodiments of the inventive subject matter may include embodiments that use surge protection devices other than MOVs, such as transient voltage suppression (TVS) diodes, gas discharge tubes (GDTs), crowbar circuits, and the like.

In this specification, there have been disclosed embodiments of the inventive subject matter and, although specific terms are employed, they are used in a generic and descriptive sense only and not for purposes of limitation. The following claims are provided to ensure that the present application meets all statutory requirements as a priority application in all jurisdictions and shall not be construed as limiting the scope of the inventive subject matter.

What is claimed:

1. An apparatus comprising:
   a surge protection device;
   a current transformer configured to sense a current through the surge protection device and to generate a secondary current responsive to the sensed current;
   a surge discriminator circuit coupled to the current transformer and configured to discriminate among a plurality of surge levels for the surge protective device responsive to the secondary current, wherein the surge discriminator circuit comprises:
   a current to voltage (I/V) converter circuit comprising:
      a rectifier circuit coupled to the current transformer;
      a capacitor coupled across an output of the rectifier circuit; and
      a zener diode coupled in parallel with the capacitor;
   a plurality of detector circuits coupled to an output of the I/V converter circuit; and
   a processor circuit coupled to the detector circuits and configured to discriminate surge levels responsive to outputs of the detector circuits.

2. The apparatus of claim 1, wherein the I/V converter circuit comprises a voltage divider circuit coupled to the output of the rectifier circuit.

3. The apparatus of claim 2, wherein the plurality of detector circuits comprises a plurality of comparator circuits coupled to the I/V converter circuit and configured to compare a voltage produced by the I/V converter circuit to respective different reference voltages.

4. The apparatus of claim 3, wherein the surge discriminator circuit further comprises a processor circuit coupled to the comparator circuits and configured to discriminate a level of a surge responsive to outputs of the comparator circuits.

5. An apparatus comprising:
   a plurality of surge protection devices coupled to respective phases of a power system;
   a plurality of current sensors configured to sense currents through respective ones of the surge protection devices; and
   a surge discriminator circuit coupled to the plurality of current sensors and configured to discriminate among a plurality of surge levels for the surge protective devices responsive to the sensed currents, wherein the surge discriminator circuit comprises:
   a plurality of current to voltage (I/V) converter circuits, respective ones of which have inputs coupled to respective ones of the plurality of current transformers; and
   a plurality of groups of detector circuits, respective one of the groups of detector circuits coupled to outputs of respective ones of the I/V converter circuits.

6. The apparatus of claim 5, wherein the surge discriminator circuit further comprises a processor circuit coupled to the groups of detector circuits and configured to discriminate surge levels responsive to outputs of the detector circuits.

7. The apparatus of claim 5, wherein each of the I/V converter circuits comprises:
   a rectifier circuit;
   a capacitor coupled across an output of the rectifier circuit; and
   a zener diode coupled in parallel with the capacitor.

8. The apparatus of claim 7, wherein each of the I/V converter circuits comprises a voltage divider circuit coupled to the output of the rectifier circuit.

9. The apparatus of claim 5, wherein the plurality of groups of detector circuits comprises a plurality of groups of comparator circuits, respective ones of the groups are coupled to respective ones of the I/V converter circuits.

10. The apparatus of claim 9, wherein the surge discriminator circuit further comprises a processor circuit coupled to the comparator circuits and configured to discriminate a level of a surge responsive to outputs of the comparator circuits.

* * * * *